US006241844B1

(12) United States Patent
Petkovsek

(10) Patent No.: US 6,241,844 B1
(45) Date of Patent: Jun. 5, 2001

(54) INTEGRAL SPECIAL SERVICE MAILING ASSEMBLY AND A METHOD FOR USING SAME

(76) Inventor: Glenn Petkovsek, 2 Saverne Cir., Little Rock, AR (US) 72211

(*) Notice: Subject to any disclaimer, the term of this patent is extended or adjusted under 35 U.S.C. 154(b) by 0 days.

(21) Appl. No.: 09/281,993

(22) Filed: Mar. 29, 1999

Related U.S. Application Data

(60) Division of application No. 08/881,141, filed on Jun. 24, 1997, now Pat. No. 5,967,558, which is a continuation-in-part of application No. 08/855,030, filed on May 13, 1997, now Pat. No. 5,951,053, which is a continuation-in-part of application No. 08/425,578, filed on Apr. 20, 1995, now Pat. No. 5,697,648.

(51) Int. Cl.[7] .......................... B32B 31/00; B42D 14/00
(52) U.S. Cl. .......................... 156/249; 156/277; 283/61
(58) Field of Search .......................... 156/249, 277; 283/61

(56) References Cited

U.S. PATENT DOCUMENTS 4,418,865 12/1983 Bowen .
4,492,334 1/1985 Dicker .
4,565,317 1/1986 Kranz .
4,682,793 7/1987 Walz .
5,183,203 2/1993 Sanders .
5,190,210 3/1993 Walz .
5,476,420 12/1995 Manning .
5,501,393 * 3/1996 Walz .
5,507,526 4/1996 Petkovsek .
5,697,648 12/1997 Petkovsek .
5,746,450 5/1998 Petkovsek .
5,967,558 * 10/1999 Petkovsek .............................. 283/61
5,984,365 * 11/1999 Petkovsek .............................. 283/67
6,003,902 * 12/1999 Petkovsek .............................. 283/61
6,050,603 * 4/2000 Petkovsek .............................. 283/61
6,071,367 * 6/2000 Petkovsek .............................. 156/277 X
6,089,613 * 7/2000 Petkovsek .............................. 283/79

* cited by examiner

*Primary Examiner*—Curtis Mayes
(74) *Attorney, Agent, or Firm*—Patents + TMS P.C.

(57) ABSTRACT

An assembly for mailing an article requiring special services and a method for mailing same are provided. The assembly includes a single sheet constructed in such a way that one portion of the sheet provides a label and the other portion provides a return postcard or other special service form for attachment to an envelope in its assembled position. The return postcard is integrally formed, but removably attached, such that the return postcard remains attached to the envelope until received by the addressee, at which time the return postcard may be removed. The assembly is designed to incorporate a form into the return postcard to simplify preparation of the mailpiece for delivery by the special service.

10 Claims, 13 Drawing Sheets

INTEGRAL SPECIAL SERVICE MAILING ASSEMBLY AND A METHOD FOR USING SAME

This application is a divisional application of U.S. patent application Ser. No. 08/881,141 filed on Jun. 24, 1997 now U.S. Pat. No. 5,967,558, which is a continuation-in-part of U.S. patent application Ser. No. 08/855,030 filed on May 13, 1997, entitled "INTEGRAL SPECIAL SERVICE MAILING ASSEMBLY AND METHOD FOR USING SAME", now U.S. Pat. No. 5,951,053, which is, in turn, a continuation-in-part of U.S. patent application Ser. No. 08/425,578 filed Apr. 20, 1995 now U.S. Pat. No. 5,697,648.

BACKGROUND OF THE INVENTION

The present invention generally relates to a form for mailing an article requiring delivery by a special service. More specifically, the present invention relates to an integral special service mailing assembly for mailing an article requiring delivery by a special service having a return receipt postcard and a label indicative of the special service and a method for using same.

It is, of course, generally known to mail an article requiring delivery by a special service, such as certified mail, registered mail, insured mail, COD, return receipt for merchandise and the like. Known components and methods for assembling a mailer for mailing an article requiring special services have multiple, separate components requiring attachment to an exterior of an envelope for the special services delivery of the article.

For example, when a customer of the U.S. Postal Service desires that an article be mailed by certified mail, for instance, an envelope containing the article is provided to the postal employee by the customer. The postal employee is then required to attach or otherwise provide the envelope with a permanent seal or label indicating that the envelope is to be delivered by certified mail.

Then, a return receipt postcard must be attached to the envelope. The postcard must be completed by the postal employee and/or the customer mailing the envelope containing the article. Some postcards include areas having an adhesive for attaching the postcard to the envelope. Other postcards require separate attachment, by using tape, for example.

Such a procedure is both complex and time-consuming, as well as labor intensive. The procedure requires the postal employee to ensure that all of the appropriate labels and documents are affixed to the envelope prior to delivery of the article. Therefore, the appropriate forms, labels and the like must be adequately stocked and available for the postal employee's use. Further, the postal employee must ensure that all articles are appropriately affixed to the envelope. In addition, the return receipt postcard must be suitably affixed to the envelope so that the return postcard is not removed during the mailing of the article to its destination. Of course, it should be understood that an envelope prepared for special service mailing may be prepared by any individual, not just a postal employee.

A need, therefore, exists for an improved integral special service mailing assembly for use with an article requiring delivery by a special service, such as certified mail, insured mail, registered mail, COD, return receipt for merchandise and the like, and a method for using same.

SUMMARY OF THE INVENTION

The present invention generally provides an assembly, and a method for using same, for mailing an article requiring delivery by a special service. More specifically, the present invention provides an assembly, and a method for using same, for mailing an article via standard parcel post delivery yet requiring means for delivery confirmation.

In an embodiment of the present invention, an assembly is provided for a mailpiece requiring delivery confirmation. The assembly has a backing sheet and a mailing form removably attached to the backing sheet. The form includes both an addressee address label and a detachable delivery confirmation label, each of the labels being separately affixable to a mailpiece.

In an embodiment, the assembly includes an adhesive layer disposed between the mailing form and the backing sheet.

In an embodiment, the assembly includes a machine-readable code section on the form including machine-readable information associated with the mailpiece.

In an embodiment, the mailing assembly includes a postage label as part of the mailing form. The postage label is detachably connected to the remaining portions of the form for separate affixation to the mailpiece.

In an embodiment, the mailing assembly includes an auxiliary label as part of the mailing form. The auxiliary label is detachably connected to the remaining portions of the form for separate affixation to the mailpiece.

In an embodiment, an anchor section forms a portion of the delivery confirmation label and a delivery confirmation card forms the remaining portion of the delivery confirmation label.

In an embodiment, an adhesive layer is provided only between the backing sheet and both the addressee address label and the anchor section and not between the backing sheet and the delivery confirmation card.

In an embodiment, the mailing form is variably printed with information necessary to serve as a return receipt postcard for the mailpiece.

In an embodiment, the delivery confirmation card is detachable from the associated anchor section.

In another embodiment of the present invention, a method is provided for mailing a mailpiece requiring delivery confirmation. The method compromises the steps of: providing a backing sheet; attaching a mailing form to the backing sheet wherein the form has an addressee address label and a detachably connected delivery confirmation label; printing addressee information on the addressee address label; affixing the addressee address label to the mailpiece; and affixing the delivery confirmation label to the mailpiece.

In an embodiment, an adhesive layer is provided between the form and the backing sheet.

In an embodiment, machine-readable code is printed on the form which includes machine-readable information associated with the mailpiece.

In an embodiment, a postage label is provided on the form which is detachably connected to the remaining portions of the form, the postage label then being affixed to the mailpiece.

In an embodiment, the method compromises the additional steps of: providing an auxiliary label on the form which is detachably connected to the remaining portions of the form; printing return address information on the auxiliary label; and affixing the auxiliary label to the mailpiece.

In an embodiment, the method comprises the additional steps of: providing an auxiliary label on the form which is detachably connected to the remaining portions of the form;

printing variable information on the auxiliary label; and detaching the auxiliary label from the remaining portions of the form.

In an embodiment, the method compromises the additional steps of: providing an anchor section on the delivery confirmation label; and providing a delivery confirmation card on the delivery confirmation label which is connected to the anchor section.

In an embodiment, machine-readable code is printed on the mailing form which includes machine-readable information associated with the mailpiece.

In an embodiment, variable information is printed on the mailing form.

In an embodiment, an adhesive layer is provided between the backing sheet and both the addressee address label and the anchor section and not between the backing sheet and the delivery confirmation card.

In an embodiment, the delivery confirmation card is detached from the delivery confirmation label.

It is, therefore, an advantage of the present invention to provide an improved assembly for mailing an article requiring delivery by a special service.

Another advantage of the present invention is to provide a simplified method for mailing an article requiring special services.

And, another advantage of the present invention is to provide an assembly that is integrally formed as a complete unit for standard parcel post delivery of an article which still requires delivery confirmation.

Yet another advantage of the present invention is to provide an assembly and a method for mailing an article requiring special services without requiring additional adhesives or fixatives for attaching the same to the mailpiece.

Moreover, an advantage of the present invention is to provide an assembly which provides for pre-imaging or pre-printing of variable information thereon.

Indeed, a further advantage of the present invention is to provide an assembly which works on automated printing equipment.

Additionally, it is an advantage of the present invention to provide an inexpensive, unitary assembly, and a method for using same, for the standard parcel post delivery of a mailpiece wherein confirmation of the delivery of the mailpiece is still desired.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides an integral special service mailing assembly for mailing an article requiring delivery by a special service. Further, the present invention provides a method for using the assembly for mailing articles requiring delivery by special services.

Figure 1:
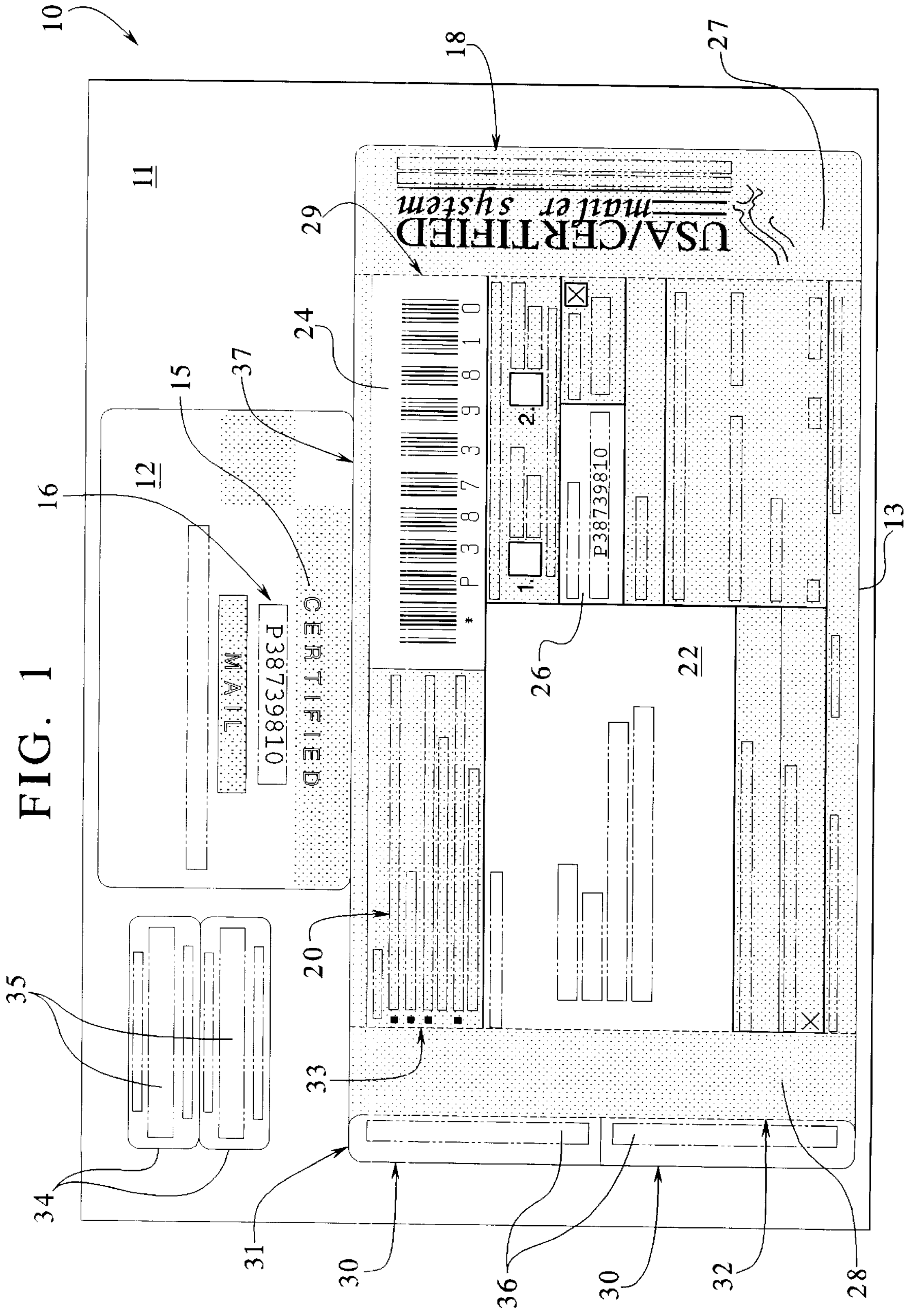
FIG. 1 illustrates a plan view of a front side of an embodiment of an assembly of the present invention.
Figure 4:
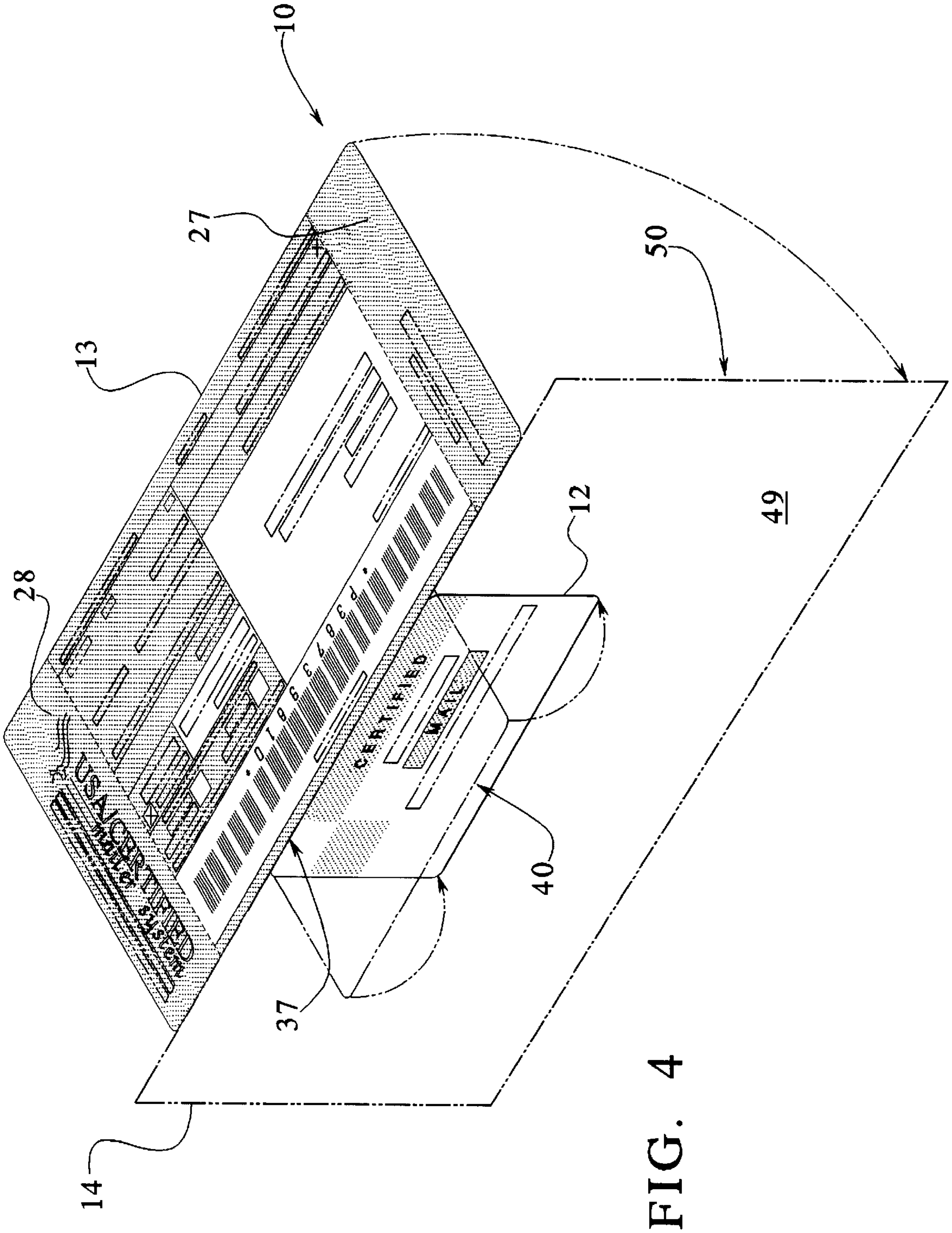
FIG. 4 illustrates a perspective view of a front side of an embodiment of the assembly of the present invention with an article to be mailed using same.

Referring now to the drawings, wherein like numerals refer to like parts, FIG. 1 is a front plan view that generally illustrates an embodiment of an assembly 10 formed from a single sheet 11 to provide both a label 12 and a return postcard 13. The assembly 10 is capable for use in mailing an article 14 requiring a special service as shown in FIG. 4. Although a certified mail envelope is illustrated, it should be understood that the present invention is applicable to any mailing item requiring special services, such as insured mail, registered mail, COD, return receipt for merchandise and the like.

The front side of the embodiment of the assembly 10 illustrated in FIG. 1 includes the label 12. The label 12 is, in a preferred embodiment, a pre-printed label indicative of the special service required for mailing of the article 14. The label 12 is preferably pre-printed directly on the sheet 11. The pre-printed label 12 includes a special service indicator 15 and a window section 16 in which an article identification number can be printed.

The assembly 10 also has a front bottom portion 18 that includes the return receipt postcard 23 that can be similar to United States Postal Service form PS-3811. The return receipt postcard 13 may include a set of instructions 20 for the sender, as well as an article addressee section 22 for pre-printing the addressee's address. The return receipt postcard 13 also has a document control number bar code 24 to aid in tracking of the article 14.

In addition, the return receipt postcard 13 has a number of sub-sections requiring completion by the sender prior to mailing. One sub-section illustrated at numeral 26 includes a machine readable article identification number corresponding to the number in the window section 16 of the pre-printed label 12. The sub-section 26 may have a background color that contrasts with the color of the return receipt postcard 13 so as to simplify the reading of the machine-readable code in the sub-section 26. Other sections, as well, may include similar color-contrasting portions within the return receipt postcard 13.

Another section of the bottom portion 18 of the assembly 10 is, in a preferred embodiment, a first anchor portion 27 at one end of the return receipt postcard 13 and a second anchor portion 28 at the opposite end. The first anchor portion 27 is separable from the return receipt postcard 13 by means of a perforated tear line 29.

The second anchor portion 28 includes at least one article tracking label 30 provided along a detachable strip 31 at the opposite end of the bottom portion 18 of the assembly 10 and is removable from the bottom portion 18 by a perforated tear line 32. The second anchor portion 28 is also separable from the return receipt postcard 13 by tearing along a perforated tear line 33.

The article tracking label 30 may be adhesively backed for subsequent attachment to a receipt or other item requiring designation of the article number for related purposes. As illustrated, two tracking labels 30 are provided in the embodiment shown. For example, one of the tracking labels 30 may be used by a postal delivery employee on a postal form PS 3849, a delivery notice, (not shown). The second tracking label 30 may be used for the receiver's record use.

In addition, in the embodiment shown, two additional tracking labels 34 are provided. The two additional tracking labels 34, which also include a section 35 for the article identification number, may be used for the sender's records.

The certified article number tracking labels 30 can also be used for the sender's and receiver's record keeping and/or accounting use. Each tracking label 30 has the section 33 for the article identification number. The tracking label 30 may be provided with adhesive on its reverse side. The tracking label 30 may also be a peel and stick type label.

Thus, the bottom portion 18 of the assembly 10 includes three main sections: the return receipt postcard 13 and the first and second anchor portions 27, 28. In addition, the tracking labels 30, 34 are provided. The label 12 is separated from the return receipt postcard 13 by a score line 37 to facilitate separation of the postcard 13 upon delivery of the article 14. As mentioned above, the return receipt postcard 13 has a number of sub-sections requiring completion by the sender prior to mailing the article 14. After delivery of the article 14, the return receipt postcard 13 is detachable from the first and second anchor portions 27, 28 by tearing along the perforated tear lines 29, 33 respectively.

An advantage of the present invention is that a number of the sub-sections of the return postcard 13 and the label 12 discussed above can be pre-printed when the assembly 10 of the present invention is used.

Figure 2:
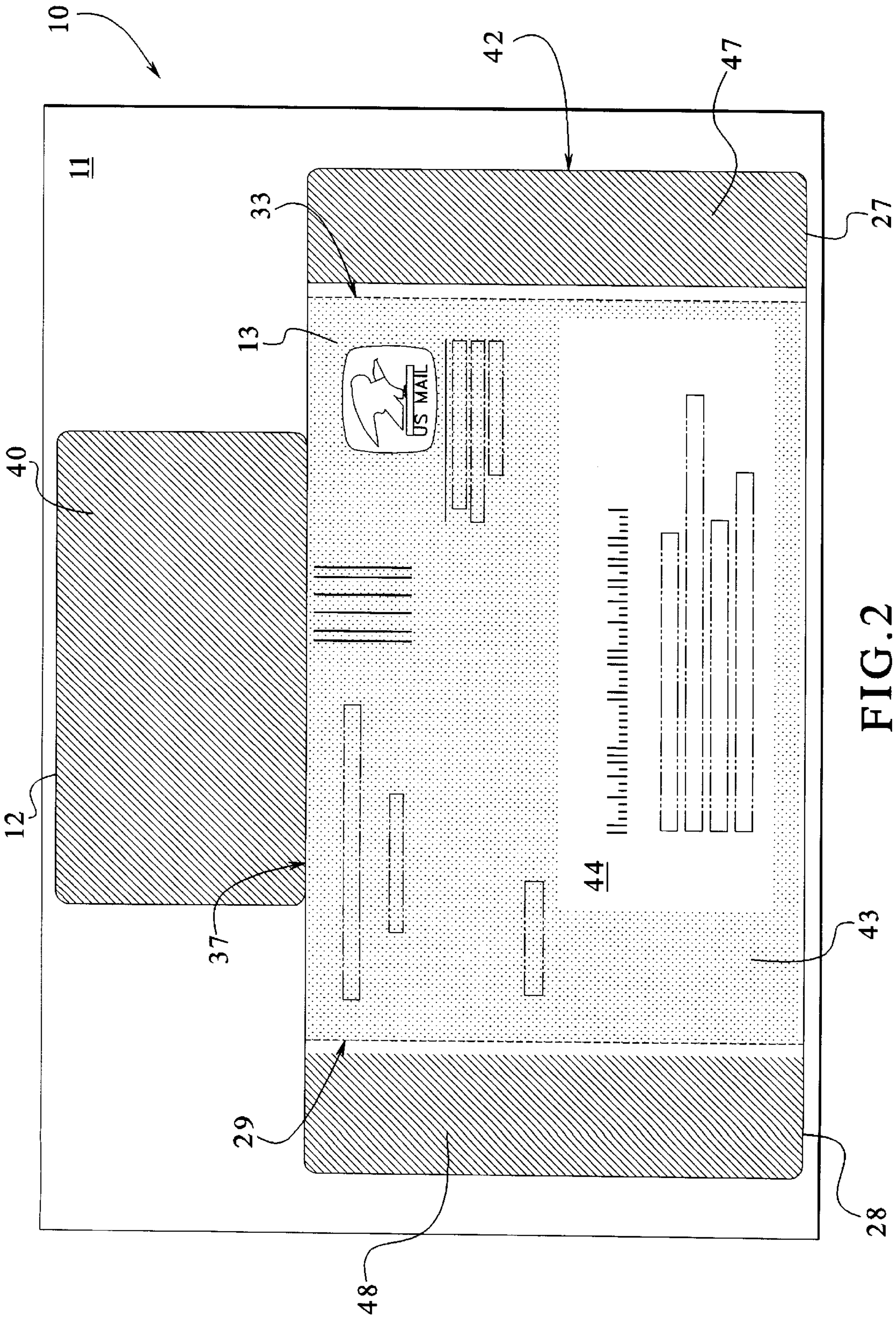
FIG. 2 illustrates a plan view of a back side of an embodiment of the assembly of the present invention.

Referring now to FIG. 2, a back plan view of an embodiment of the assembly 10 is illustrated. The reverse side of the label 12 shown in FIG. 1 has an adhesive portion 40. The adhesive portion 40 may be a peel and stick type adhesive and is provided to seal the label 12 to the article 14 requiring special service mailing as shown in FIG. 4.

A back bottom portion 42 of the assembly 10 includes a front side 43 of the return receipt postcard 13. The return receipt postcard 13 includes a "Return To" section 44. The "Return To" section 44 may be color-contrasted with the remainder of the return receipt postcard 13 to enable simplified reading of the "Return To" section 44.

The score line 37 is provided along the top side of the return receipt postcard 13. For subsequent detachment of the return receipt postcard 13, the perforated tear lines 29, 33 are provided along the edges adjacent to the anchor portions 27, 28. The first anchor portion 27 has a first adhesive portion 47 and the second anchor portion 28 has a second adhesive portion 48 to adhere the back bottom portion 42 to the article 14 prior to mailing.

Figure 3:
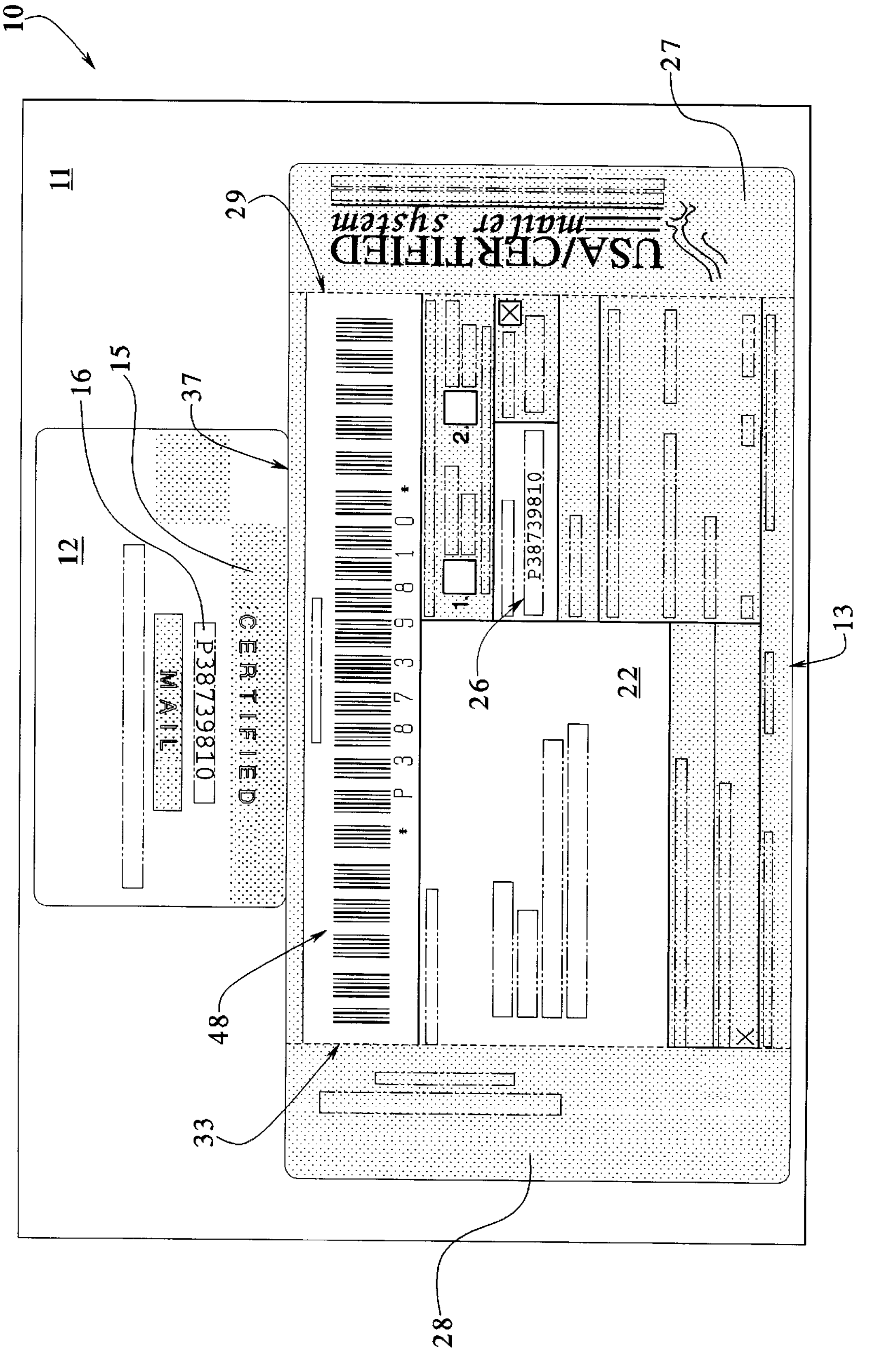
FIG. 3 illustrates a plan view of a front side of another embodiment of the assembly of the present invention.

FIG. 3 shows another embodiment of the assembly 10 of the present invention, wherein like numerals represent like parts. This embodiment is a simplified version of the prior embodiment in that it does not have the instruction section 20 nor does it have the tracking labels 30, 34. However, the embodiment illustrated in FIG. 3 as an enlarged bar code region 48 for easier reading during high speed processing. The embodiment of the present invention illustrated in FIG. 3 is shown in use in FIG. 4.

Referring now to FIG. 4, the article 14 requiring special service, shown from its front side, is shown. The pre-printed label 12 is shown having the window section 16 in which the certified mail number is printed either manually or automatically. As illustrated, the label 12 folds down onto a front side 49 of the article 14 requiring special service mailing. The label 12 is adhered to the front side 49 of the article 14 by means of the adhesive portion 40 located on the back side of the label 12 (see FIG. 2). Also as illustrated in FIG. 4, the bottom portion 18 of the assembly 10, including the anchor portions 27, 28 and the return receipt postcard 13, is sealed to a back side 50 of the article 14 and the anchor portions 27, 28 are sealed to the article 14 by the adhesive portions 47 and 48, respectively. Also, the score line 37 is located at the top of the article 14 to provide for easier subsequent separation of the return receipt postcard 13 from the anchor portions 27, 28 and the label 12 upon delivery of the article 14.

Figure 5:
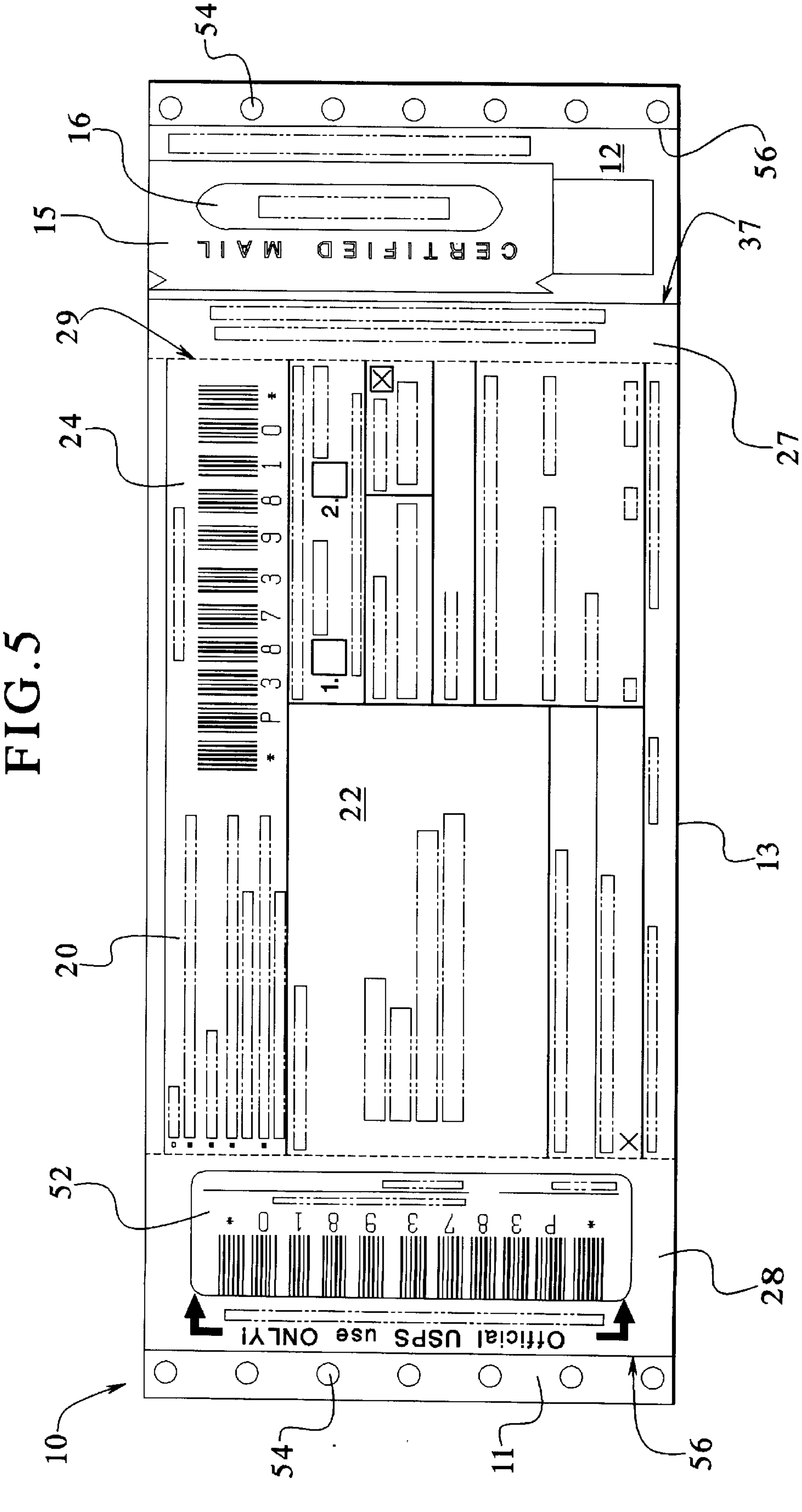
FIG. 5 illustrates a plan view of a front side of another embodiment of the assembly of the present invention.
Figure 6:
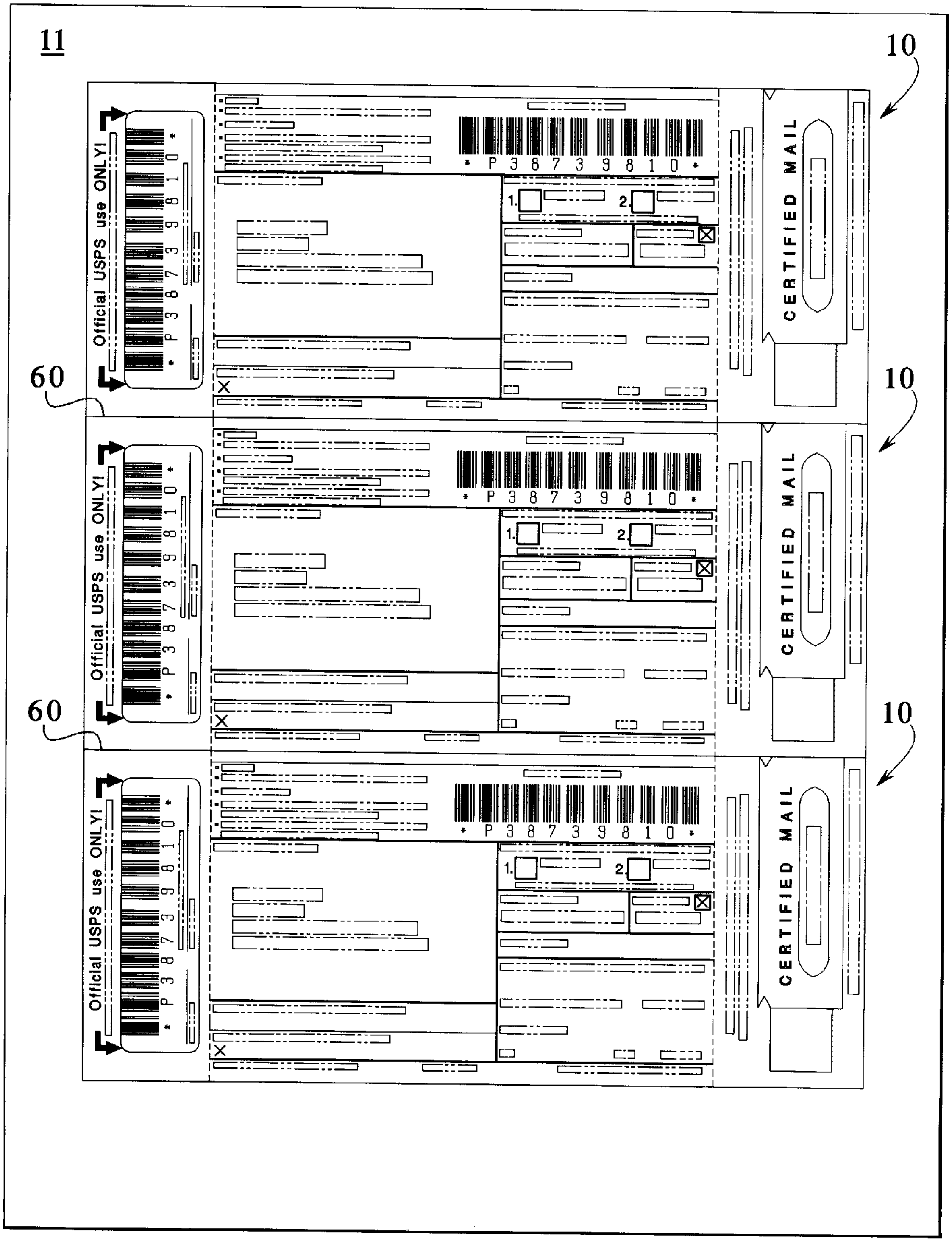
FIG. 6 illustrates another embodiment of the assembly of the present invention in which a plurality of assemblies are located on a single sheet.

FIG. 5 illustrates another embodiment of the assembly 10 of the present invention. In the embodiment shown in FIG. 5, the orientation of the label 12 with respect to the postcard 13 is changed. However, like numerals represent like parts and the score line 37 between the label 12 and the postcard 13 is shown located between the label 12 and the return receipt postcard 13. In addition, a tracking indicator 52 is provided on the second anchor portion 28. Another variation in the embodiment shown in FIG. 5 is that the sheet 11 has a plurality of tracker holes on the edges thereof for use in a printer having tracking wheels to advance the paper. The tracking holes 54 are located on a tracking strip 56. In addition, a plurality of the assembly 10 can be provided on a single sheet 11 as shown in FIG. 6. Each assembly 10 is separable from the adjacent assembly 10. This can be accomplished by a score line 60. In such a case, it would be preferred that the assembly 10 be a peel and stick type assembly that is removably attached to the sheet 11. Thus each individual assembly 10 could be detached from the sheet 11 as needed. Also the entire sheet could be printed at one time for subsequent separation and application to separate articles 14.

The assembly 10 can be printed using any known method of printing and is not limited to any single type. Such printing methods include, but are not limited to, laser printing, thermal printing, dot matrix printing and the like. Printing may be performed on continuously fed forms or on individually fed forms.

Figure 7:
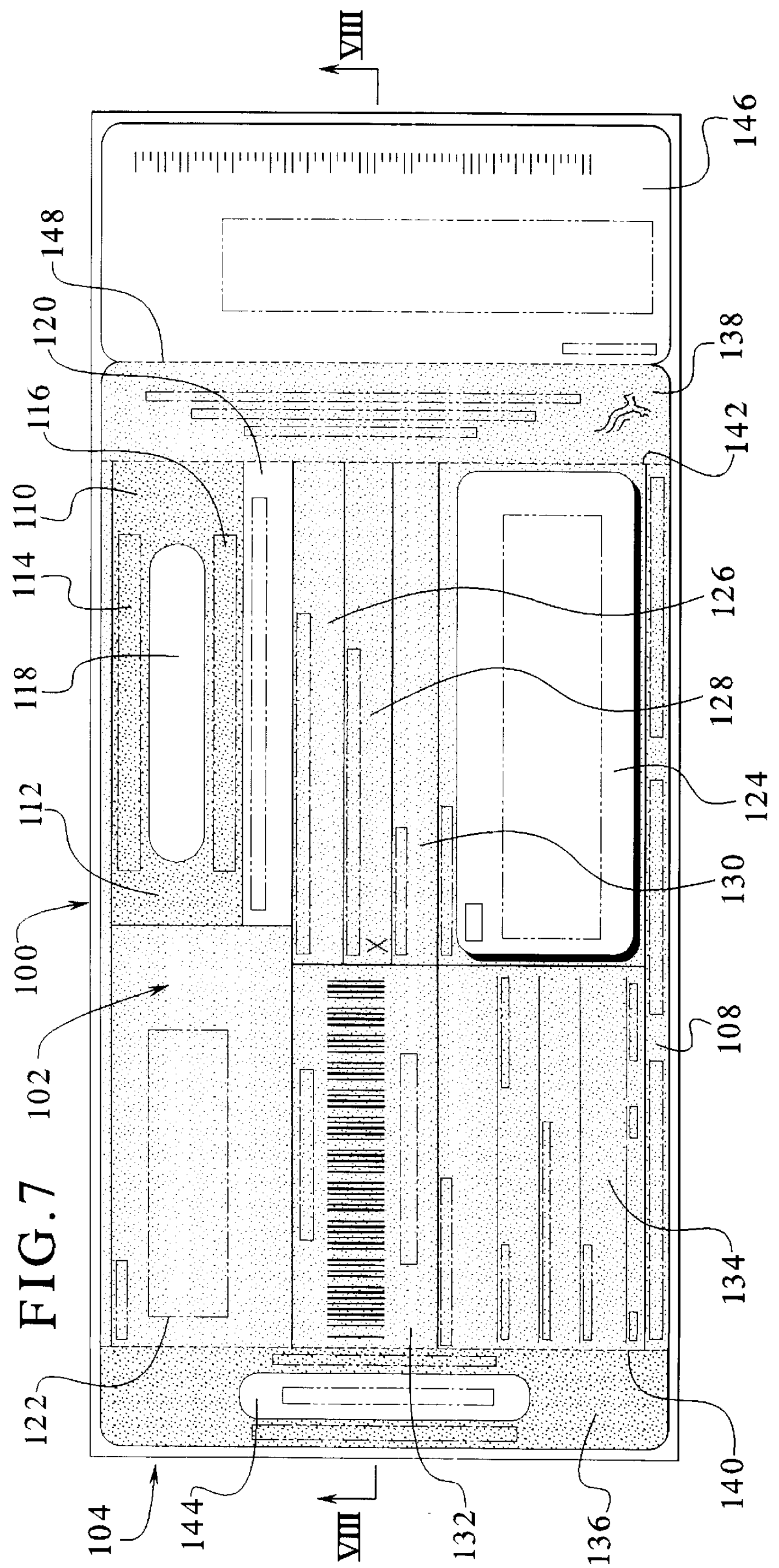
FIG. 7 illustrates a plan view of a front side of another embodiment of an assembly of the present invention.
Figure 8:
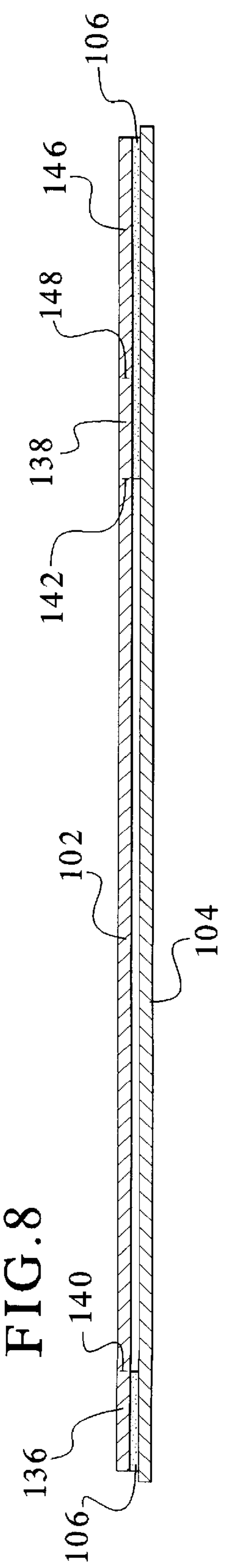
FIG. 8 illustrates a cross-sectional view taken generally along the line VIII—VIII of FIG. 7.
Figure 9:
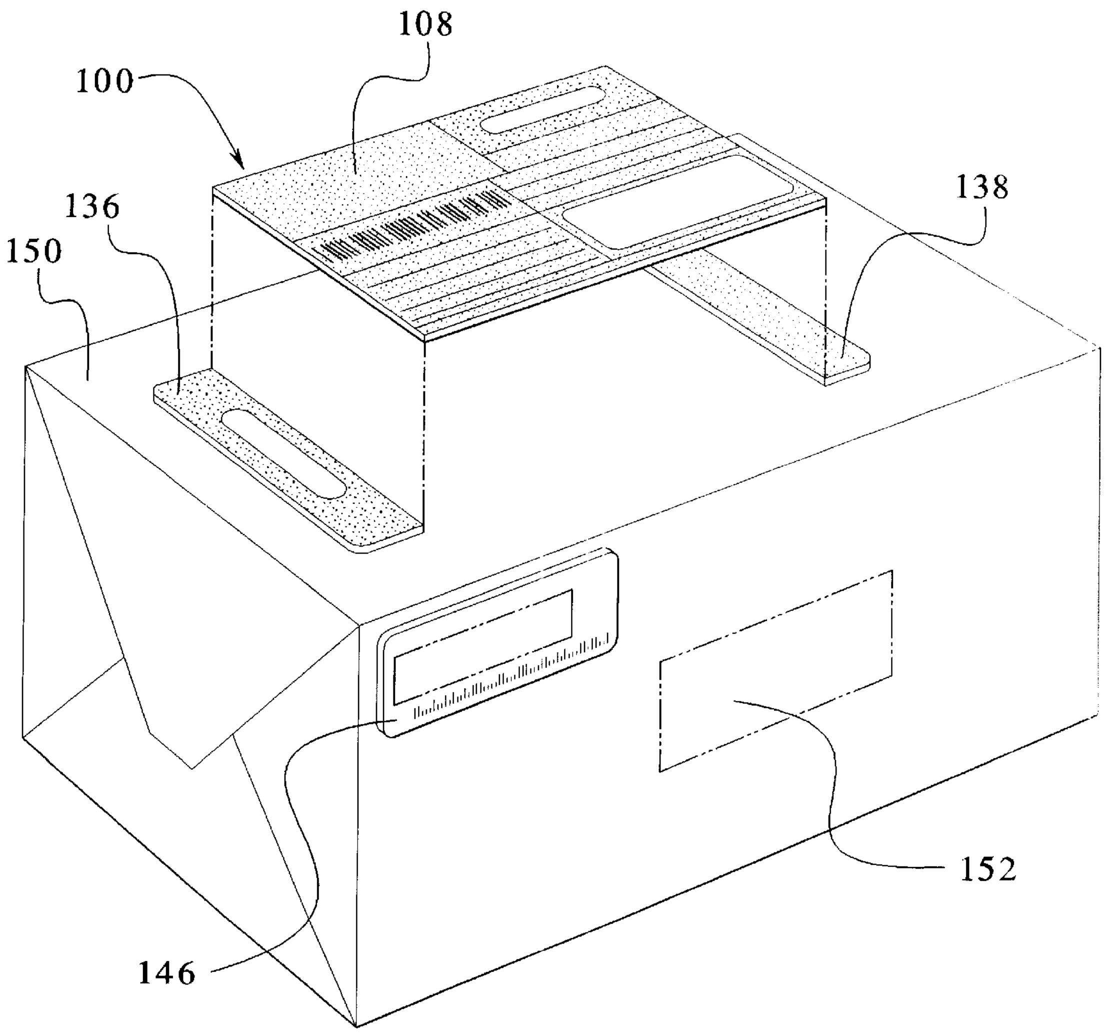
FIG. 9 illustrates a perspective view of an embodiment of the assembly as used on a package.

Referring now to FIGS. 7–9, an alternate embodiment of a mailing assembly 100 is illustrated. The mailing assembly 100 includes a first layer 102 and a second layer 104. The first layer 102 and the second layer 104 are separably attached via an adhesive 106 between selected portions of the two layers 102,104. The first layer 102 includes a plurality of separable parts including a return postcard 108 having an integrally formed designator section 110. The return postcard conforms with requirements for, for example, United States Postal Service Form 3811. The designator section 110 includes information necessary to comply with requirements for, for example, United States Postal Service Forms 3804, 3806, 3813, 3856 or the like. The designator section 110 heretofore has been implemented as a separate and distinct form apart from the return postcard 108. The unique arrangement of the return postcard 108 with the designator section 110 allows for incorporation of what previously required completion of two forms and subsequent attachment of two forms to, for example, a package to be delivered requiring special services for delivery thereof. As a result, use of the mailing assembly 100 of the present invention substantially simplifies and expedites the preparation of such a mailpiece requiring delivery by a special service, such as certified mail, return receipt for merchandise, insured mail, registered mail, and the like.

The designator section 110 includes a first area 112 that is distinctly colored from a remainder of the area. For example, the color of the first area 112 may be green to designate the generally recognized color for certified mail or may be brown to designate the generally recognized color for return receipt for merchandise, or the like. Within the first area 112, wording areas 114,116 may be provided to specifically denote the type of special service for which the mailing assembly is to be implemented. An article identifying number area 118 is provided within the designator section 110 to provide, preferably, a machine readable number associated with the mailpiece. This is particularly useful for tracking of the mailpiece before, during and after delivery by the special service.

A special instruction area 120 is also incorporated within the designator section 110. Both the article identifying number area 118 and the special instruction area 120 have a distinctly colored background to improve the machine readability of the information within these areas. The special instruction area 120 may include, for example, specific instructions such as "RESTRICTED DELIVERY", "ADDRESSEE'S ADDRESS REQUESTED", "RETURN RECEIPT REQUESTED" or the like. The return postcard 108 includes other information generally required within specific sections, such as sender information area 122, article addressee area 124, recipient name area 126, recipient signature area 128, date received area 130, machine readable document control area 132, and addressee address area 134.

On each side of the return postcard 128 are anchor portions 136,138. The anchor portions 136,138 are separable from the return postcard 128 by perforated tear lines 140, 142, respectively. The anchor portions 136,138 may also be printed with variable information or preprinted information relating to the mail handling or information of a general nature. As shown in the anchor portion 136, an article identifying number area 144 is provided that may include a machine readable article identifying number related to the special delivery of the mailpiece for which the mailing assembly is used. The article identifying number area 144 may be implemented as a removable label from within the anchor portion 136 separable therefrom by die-cut lines, score lines, or the like. The anchor portions 136,138 are removably secured to the second layer 104 via the adhesive 106.

As further illustrated, an auxiliary label 146 may be provided and implemented in a number of fashions. For example, the auxiliary label 146 may act as a mailing label, a return address label, or the like. The auxiliary label 146 may be separable from a remainder of the mailing assembly 100 via a score line 148. Alternatively, the score line 148 may be implemented as a perforated tear line, die-cut lines or the like. As a result, the auxiliary label 146 is separable from the remainder of the mailing assembly 100 as well as from the second layer 104 with an adhesive back side for attachment to, for example, a mailpiece.

As illustrated in FIG. 9, the mailing assembly 100 is attached to a mailpiece 150 by removing the mail assembly 100 from the second layer 104 and attachment of the anchor portions 136,138 using the adhesive 106 on a back side of the anchor portions 136,138 for attachment to the mailpiece 150. The return postcard 108 is separable from the anchor portions 136,138 following delivery of the mailpiece 150 to, for example, confirm receipt of delivery of the mailpiece 150. As illustrated, the auxiliary label 146 is incorporated as a return address label. Alternatively, the auxiliary label 146 may be used as an addressee's label and incorporated in the area generally designated at 152 in FIG. 9.

Figures 10, 11, 12:
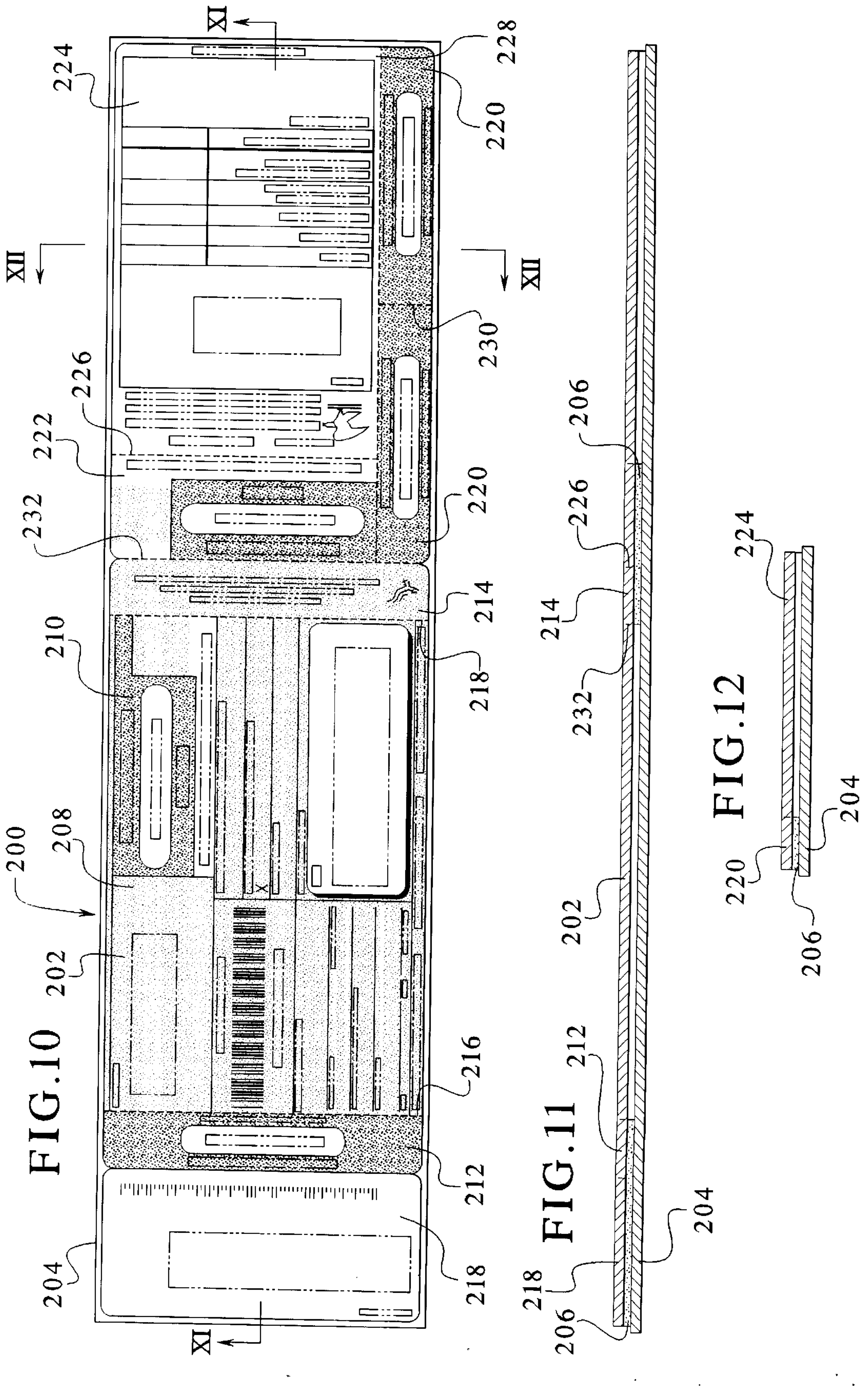
FIG. 10 illustrates a plan view of a front side of yet another embodiment of an assembly of the present invention.
FIG. 11 illustrates a cross-sectional view taken generally along the line XI—XI of FIG. 10.
FIG. 12 illustrates a cross-sectional view taken generally along the line XII—XII of FIG. 10.

Referring now to FIGS. 10–12, an alternate embodiment of a mailing assembly 200 is generally illustrated. The assembly 200 incorporates a first layer 202 and a second layer 204 with an adhesive 206 in selected areas therebetween as generally illustrated in FIGS. 11 and 12. The first layer 202 of the mailing assembly 200 includes a return postcard 208 with an incorporated designator section 210. At each end of the return postcard 208 are anchor portions 212,214 separable by perforated tear lines 216,218, respectively. On a back side of each of the anchor portions 212,214 is the adhesive 206. The adhesive 206 provides for attachment of the first layer 202 to the second layer 204 and following removal of the first layer 202 from the second layer 204, the adhesive 206 beneath the anchor portions 212,214 allows for attachment of the first layer 202 to a mailpiece. An auxiliary label 218 is provided exterior to the anchor portion 212 and has the adhesive 206 on its back side. As a result, the auxiliary label 218 may be implemented as described with references to FIGS. 7-9.

The mailing assembly 200 also includes additional article identifying number areas 220 with the adhesive 206 on its back side for removable attachment from the second layer 204 and subsequent attachment of the article identifying number area 220 to a specific item as necessary. In addition, the mailing assembly 220 may further include an additional designator section 222 that substantially repeats the information in the designator section 210 for additional usage on the mailpiece on which the mailing assembly 200 is implemented.

Further, the mailing assembly 200 may include a receipt section 224. The receipt section 224 is a receipt for the sender of the mailpiece. The receipt section 224 generally includes information corresponding to, for example, United States Postal Service Form 3800. The receipt 224 is detachable from a remainder of a mailing assembly 200 via perforated tear lines 226,228. The perforated tear line 228 is also implemented to remove the article identifying number areas 220 from a remainder of the mailing assembly 200 and is separately detachable one from the other via the perforated tear line 230. In addition, the auxiliary designator section 222 may also be separable from a remainder of the assembly 200, namely the anchor portion 214, via the perforated tear line 232. The embodiment illustrated in FIG. 10 may be implemented similarly to the invention shown and described with reference to FIGS. 7–9. The return receipt 224 is typically removed for use by the sender as verification that the special service was requested and the amount paid for that special service.

Either of the mailing assemblies 100,200 may be incorporated in a series of forms continuously repeated. Therefore, the mailing assemblies 100 or 200 may be linked together such that they are incorporated as a continuous series of forms or, alternatively, a roll of forms, or the like.

The second layer 104 or 204 of the mailing assemblies 100 or 200, respectively, may include an area that is die-cut with a frozen label such that if duplex printing is implemented and variable information is simultaneously or subsequently printed on a back side of the return postcard, for example, then that information remains on the back side of the return postcard following removal of the second layer from a remainder of the mailing assembly 100,200.

Figure 13:
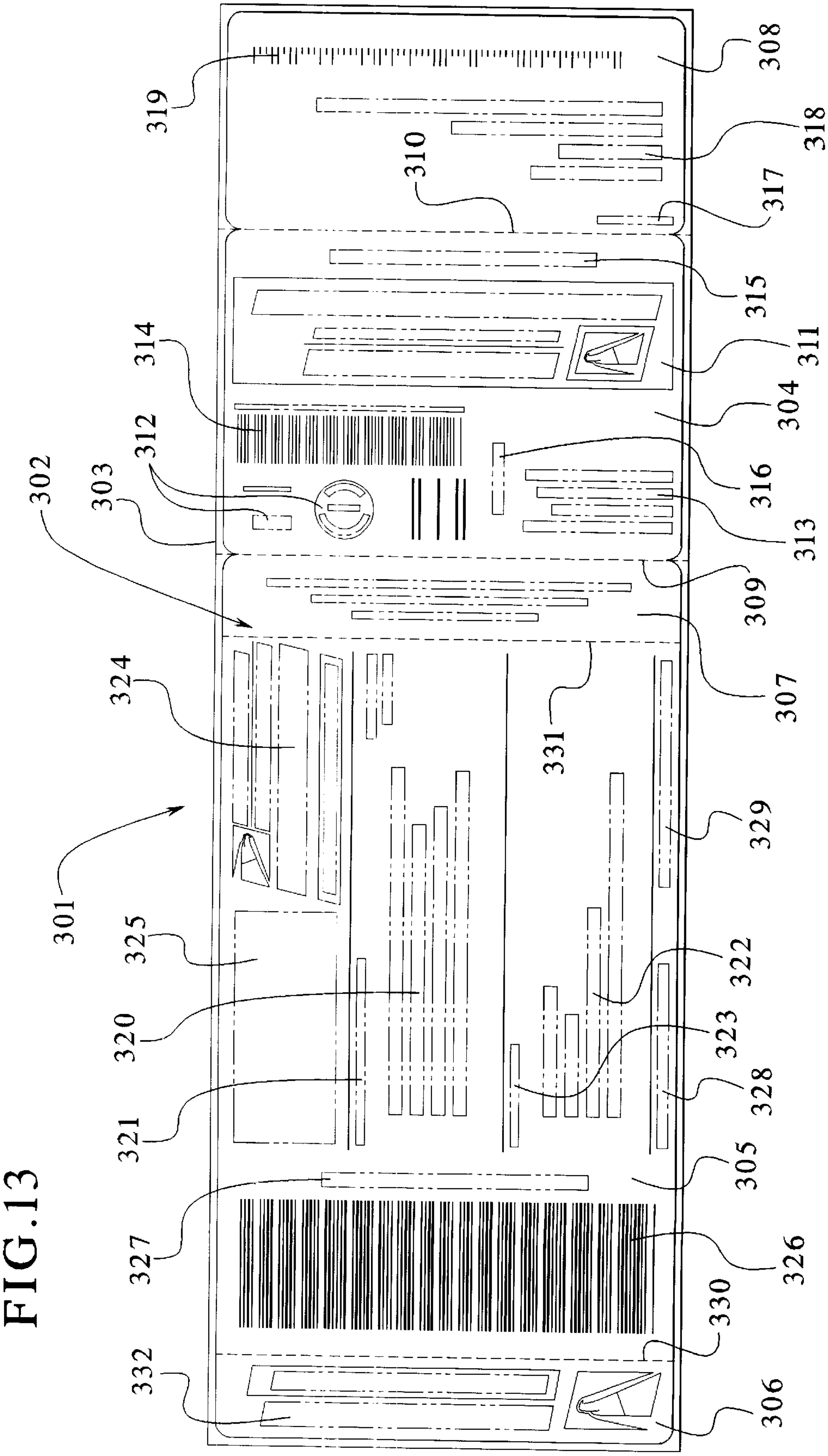
FIG. 13 illustrates a plan view of a front side of yet another embodiment of an assembly of the present invention.

Referring now to FIGS. 13–18, two more alternative embodiments of the present invention are illustrated. A mailing assembly 301 is shown in FIG. 13 that includes a mailing form 302 adhesively affixed to a backing sheet 303. The mailing form 302 includes a plurality of separable parts including a mailing label 304, a return receipt postcard 305, a first anchor section 306, a second anchor section 307 and an address label 308. A first tear line 309 and a second tear line 310 are perforations which protrude all the way through to, and preferably include, the backing sheet 303 whereby the mailing label 304 and the address label 308 may be respectively detached from a remainder of the mailing assembly 301 with their respective portions of the backing sheet 303 still affixed thereto.

The mailing label 304 includes a mailing designation section 311 which is imprinted, for example, with information relating to the type of mailing service used (e.g., U.S. Priority Mail). The mailing label 304 also includes a postage section 312 whereupon all of the necessary postage information may be automatically stamped. The mailing label 304 further includes a sender address section 313 and a mail class section 316 which indicates the priority level of the chosen mail service (“First Class”, for example). Also located on the mailing label 304 are a mailing label bar code 314 and a mailing label article number 315. This machine-readable information is specifically associated with the mailpiece upon which the mailing assembly 301 is used and is intended to be compatible with the United States Postal Service’s existing track and trace network. The mailing label 304 may be detached from the remainder of the mailing assembly 301 along the first tear line 309 and the second tear line 310 whereby it may, after being peeled away from its associated portion of the backing sheet 303, be affixed to the mailpiece.

The address label 308 of the mailing form 302 includes an addressee heading section 317, which might be as simple as “Send To:”, as well as an addressee’s section 318 indicating the addressee’s address. Address label 308 also includes an address label bar code 319 which directly corresponds to that information found in the mailing label bar code 314 on the mailing label 304. The address label 308 is fully detachable from the remainder of the mailing assembly 301 via the second tear line 310 whereby, after being peeled away from its respective portion of the backing sheet 303, it may be independently affixed to the mailpiece.

It is noted that the address label 308 may have some alternative uses. Indeed, the address label 308 may include the return address of the sender of the mailpiece whereby it would serve as a simple return address label. Conversely, the address label 308 may be used as a customer mailing receipt. The receipt may include, for example, such information as the article number, the addressee’s address, the type of mailing service employed and the fees associated with such service. When used in this manner, the address label 308 may not be peeled away from its respective portion of the backing sheet 303. Rather, that portion of the backing sheet which is adhesively connected to the address label 308 remains affixed thereto as the address label 308 is detached from the remainder of the mailing assembly 301 along the second tear line 310.

The return receipt postcard 305 of the mailing form 302 conforms with requirements for, for example, United States Postal Service Form 3811. The return receipt postcard 305 includes a sender heading section 321 (e.g., “Sender’s Name and Address”) and a second sender address section 320. Similarly, the return receipt postcard 305 includes a second addressee heading section 323 and a second addressee address section 322. A second mailing designation section 324 is intended to include the same type of information as found in the mailing designation section 311 of the mailing label 304. In addition, the return receipt postcard 305 includes an instruction section 325 which preferably includes general delivery instructions for the person delivering the mailpiece. The return receipt postcard 305 also includes a return receipt postcard bar code 326 and a return receipt article number 327 which reflect the same information as found in the mailing label bar code 314 and the mailing label article number 315, respectively. Postal Service form number section 328 and Postal Service form description section 329 provide additional information on the return receipt postcard 305 which is typical of most mailing forms used by the U.S. Postal Service.

The return receipt postcard 305 is positioned on the mailing form 302 between the first anchor section 306 and the second anchor section 307. The first anchor section 306, which is detachably connected to the return receipt postcard 305 along a third tear line 330, preferably includes a third mailing designation section 332 which reflects the same type of information as found in both the mailing designation section 311 and the second mailing designation section 324. The second anchor section 307 is detachably connected to the return receipt postcard 305 along a fourth tear line 331.

The combination of the first anchor section 306, the return receipt postcard 305 and the second anchor section 307 may be detached from the remainder of the mailing assembly 301, together with their respective portions of the backing sheet 303, along the first tear line 309. These three sections of the mailing form 302 may then be affixed to the mailpiece separate and apart from the mailing label 304 and the address label 308.

The unique arrangement of the return receipt postcard 305, along with the separately affixable mailing label 304 and the address label 308, allows for the incorporation into a single form of what previously required completion of two forms and subsequent attachment of two forms to, for example, a package to be delivered via U.S. Priority Mail service whereby delivery confirmation of the associated mailpiece is also required. As such, use of the mailing assembly 301 of the present invention substantially simplifies and expedites the preparation of the mailpiece requiring delivery by such a service. Increased efficiency is further experienced due to the fact that the mailing assembly 301 may be variably printed with a variety of information.

Figure 14:
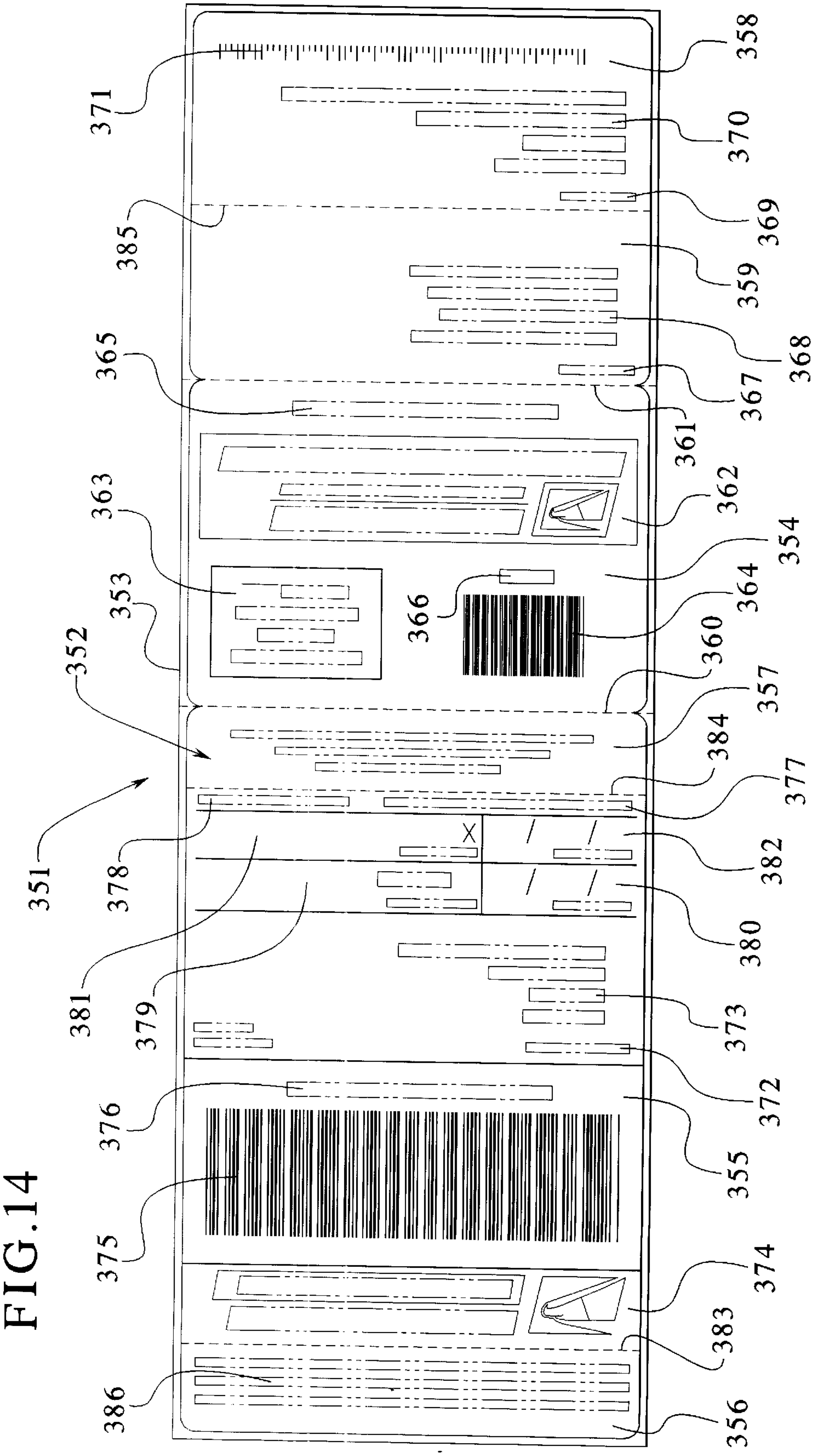
FIG. 14 illustrates a plan view of a front side of a further embodiment of an assembly of the present invention.

Another embodiment of the present invention is shown in FIG. 14. The primary differences between a mailing assembly 351 shown in FIG. 14 and the mailing assembly 301 shown in FIG. 13 are that that the mailing assembly 351 includes a separately detachable return address label 359 and includes areas on its return receipt postcard 355 which require written confirmation of delivery.

Specifically, the mailing assembly 351 includes a mailing form 352 adhesively affixed to a backing sheet 353. The mailing form 352 includes a plurality of separable parts including a mailing label 354, a return receipt postcard 355, a first anchor section 356, a second anchor section 357, an address label 358 and a return address label 359.

The mailing label 354 includes a mailing designation section 362, a postage section 363, a mailing label bar code 364, a mailing label article number 365 and a mail class section 366. The mailing label 354 does not, however, include the sender's return address as such information is preferably included on the return address label 359 in the sender address section 368. The return address label 359 also includes a sender heading section 367 associated with the sender address section 368.

The use and function of the address label 358 is the same as that described in connection with the address label 308 from FIG. 13. Again, the address label 358 includes an addressee heading section 369, an addressee address section 370 and an address label bar code 371.

The address label 358 is separately detachable from the remainder of the mailing assembly 351 along a ninth tear line 385 whereby it may then be separately affixable to a mailpiece. Similarly, the return address label 359 may be separately detached from the remainder of the mailing assembly 351 along the sixth tear line 361 and the ninth tear line 385. The mailing label 354 may then also be detached from the remainder of the mailing assembly 351 along the fifth tear line 360 and the sixth tear line 361.

The return receipt postcard 355 includes a second addressee heading section 372 and an associated second addressee address section 373. A second mailing designation section 374 is also provided on the return receipt postcard 355 to provide information on the type of mailing service desired. Again, the return receipt postcard 355 includes a return receipt bar code 375 and a return receipt article number 376 for U.S. Postal Service tracking purposes. Also included are a Postal Service form number section 377 and a Postal Service form description section 378.

The embodiment shown in FIG. 14 preferably includes a separate sender's name section 379 which may be variably printed with the name of the person, or entity, mailing the mailpiece. A sender's date section 380 is adjacently positioned to the sender's name section 379 whereby the date of mailing may be written down. The return receipt postcard 355 also includes a deliverer's name section 381 and associated deliverer's date section 382 wherein the individual delivering the mailpiece enters his or her name and date upon delivery of the mailpiece. Once such information is entered, the return receipt postcard 355 may be detached from the first anchor section 356 along a seventh tear line 383 and from the second anchor section 357 along an eighth tear line 384 and used for delivery confirmation purposes. The first anchor section 356 is preferably provided with an instruction section 386 which includes delivery instructions for the individual delivering the mailpiece.

Figure 15:
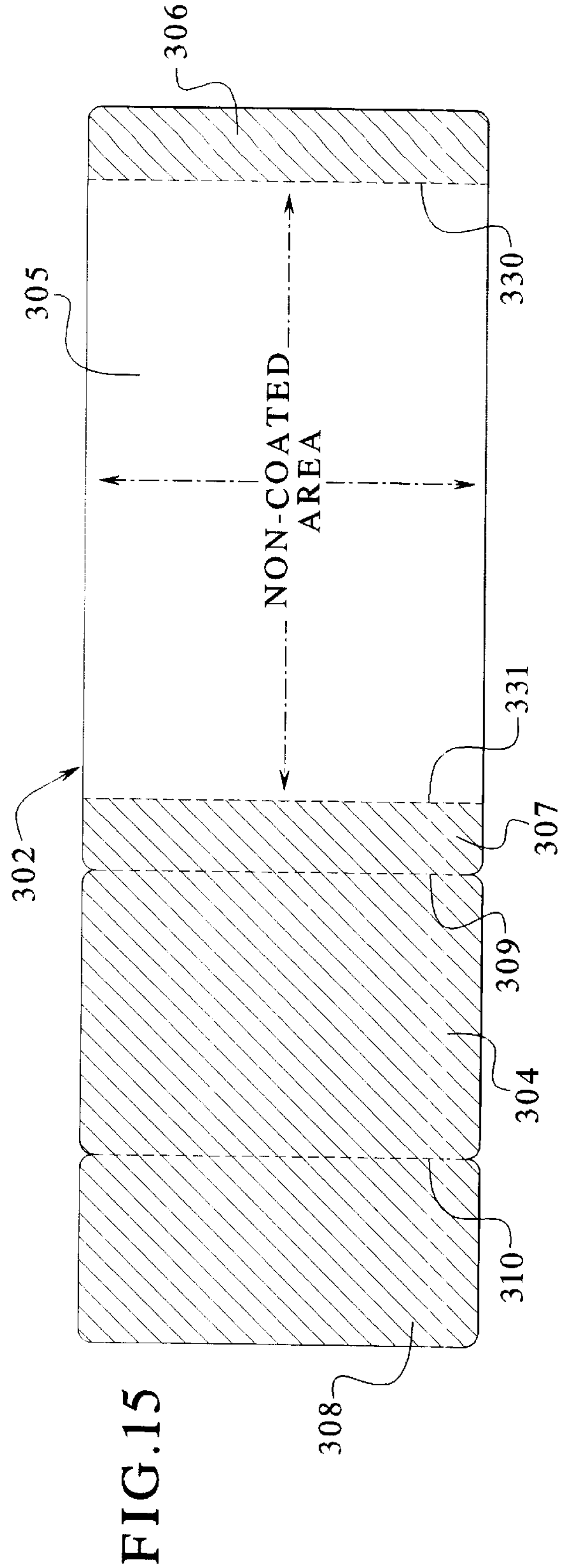
FIG. 15 illustrates a plan view of a back side of an embodiment of the mailing form of FIG. 13 removed from its associated backing sheet.

Turning now to FIG. 15, a plan view of a back side of the mailing form 302 from FIG. 13 is shown after removal of the backing sheet 303 thereon. As shown, the back sides of the address label 308, the mailing label 304, the second anchor section 307 and the first anchor section 306 are covered with an adhesive coating which serves the dual purpose of removably attaching the mailing form 302 to the backing sheet 303 and, subsequently, permanently attaching the mailing form 302 to a mailpiece. Conversely, the return receipt postcard 305, defined as that area between the fourth tear line as 331 and the third tear line 330, does not include any such adhesive backing. The back side of the return receipt postcard 305 may include various return address and postage information necessary to allow the return receipt postcard 305 to be mailed back to the sender of the mailpiece for delivery confirmation purposes. The return receipt postcard 305 may, alternatively, simply be retained by the Postal Service as a means for delivery confirmation.

Figure 16:
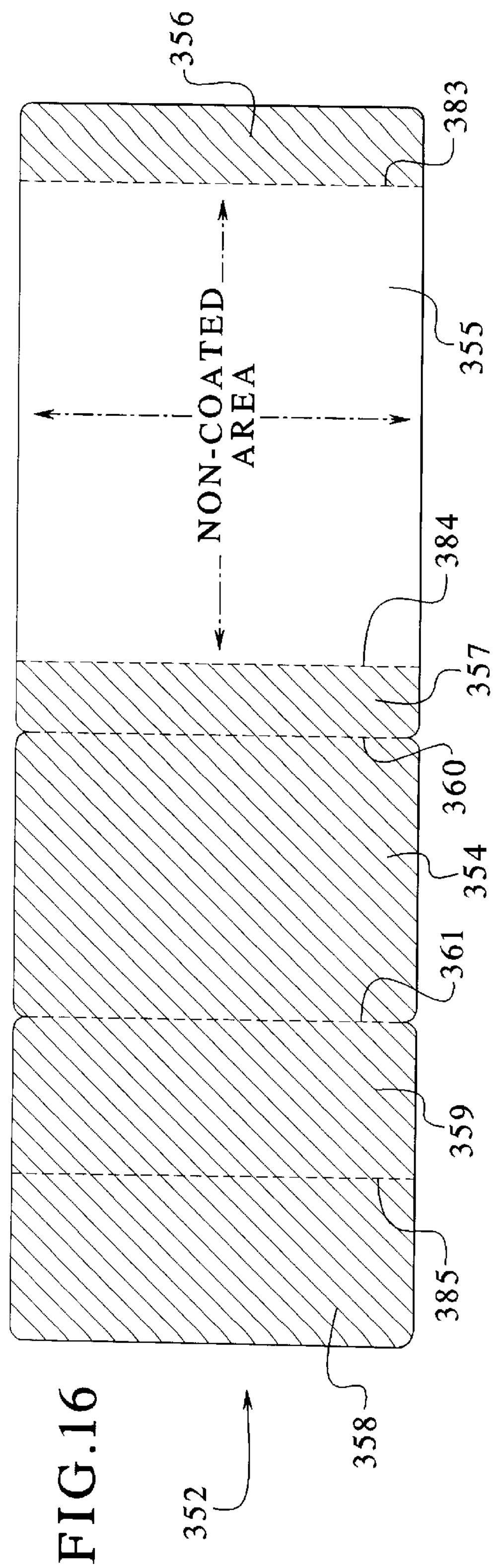
FIG. 16 illustrates a plan view of a back side of an embodiment of the mailing form of FIG. 14 removed from its associated backing sheet.

FIG. 16 shows a plan view of a back side of the mailing form 352 from FIG. 14 after removal of its associated backing sheet 353. As shown, the back sides of the address label 358, the return address label 359, the mailing label 354, the second anchor section 357 and the first anchor section 356 are covered with an adhesive coating which again serves the dual purpose of removably attaching the mailing form 352 to the backing sheet 353 and, subsequently, permanently attaching the mailing form 352 to the mailpiece. The return receipt postcard 355 has no such adhesive backing so that it may be detached from the remainder of the mailing form 352 along the eighth tear line 384 and the seventh tear line 383.

Figure 17:
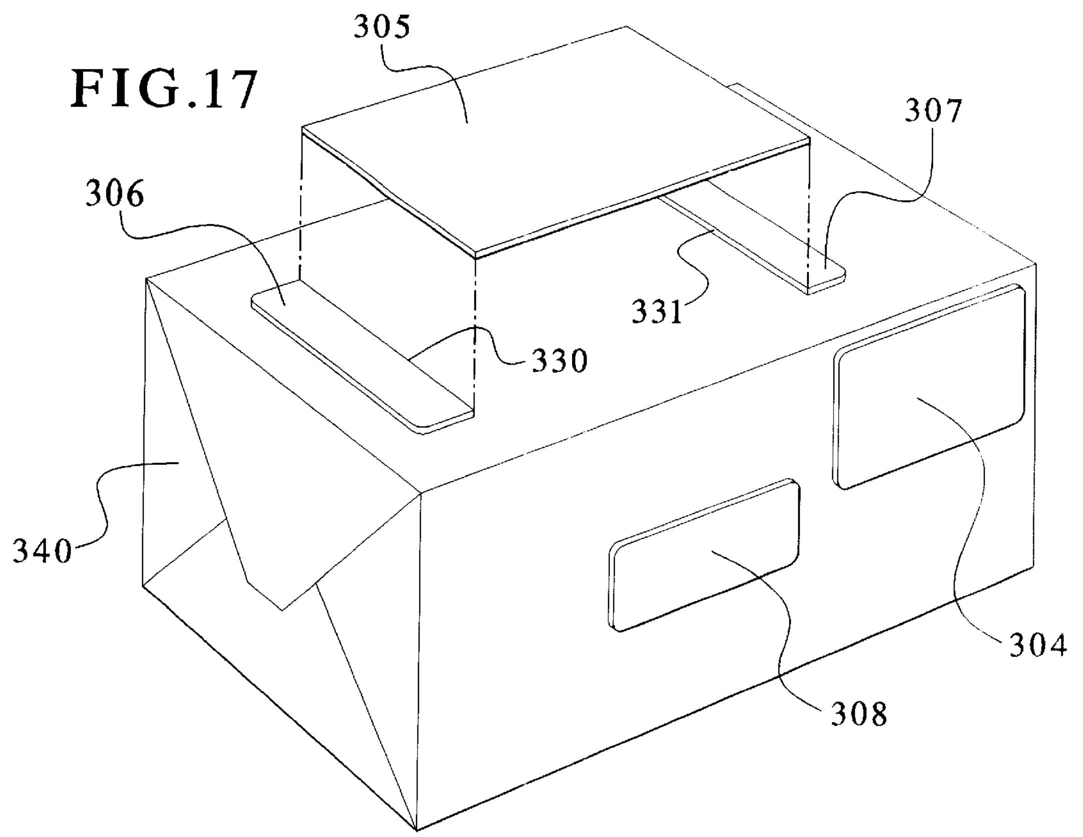
FIG. 17 illustrates a perspective view of a front side of an embodiment of the mailing form of FIG. 13 with separable portions affixed to a mailpiece and with a return receipt postcard of the mailing form detached from anchor portions of the mailing form.

As illustrated in FIG. 17, the mailing form 302 of the mailing assembly 301 shown in FIG. 13 is attached to a mailpiece 340. Specifically, the address label 308 and the mailing label 304 are preferably affixed to one side of the mailpiece 340 as shown using their respective adhesive backings. Similarly, the first anchor section 306 and the second anchor section 307, with the return receipt postcard 305 detachably connected therebetween, are adhesively affixed to another side of the mailpiece 340. The return receipt postcard 305 is separable from the first anchor section 306 and the second anchor section 307 along the third tear line 330 and the fourth tear line 331, respectively, following delivery of the mailpiece 340 to confirm receipt of delivery of the mailpiece 340. Again, the return receipt postcard 305 may be either retained by the U.S. Postal Service for delivery confirmation purposes or, alternatively, mailed back to the sender of the mailpiece.

Figure 18:
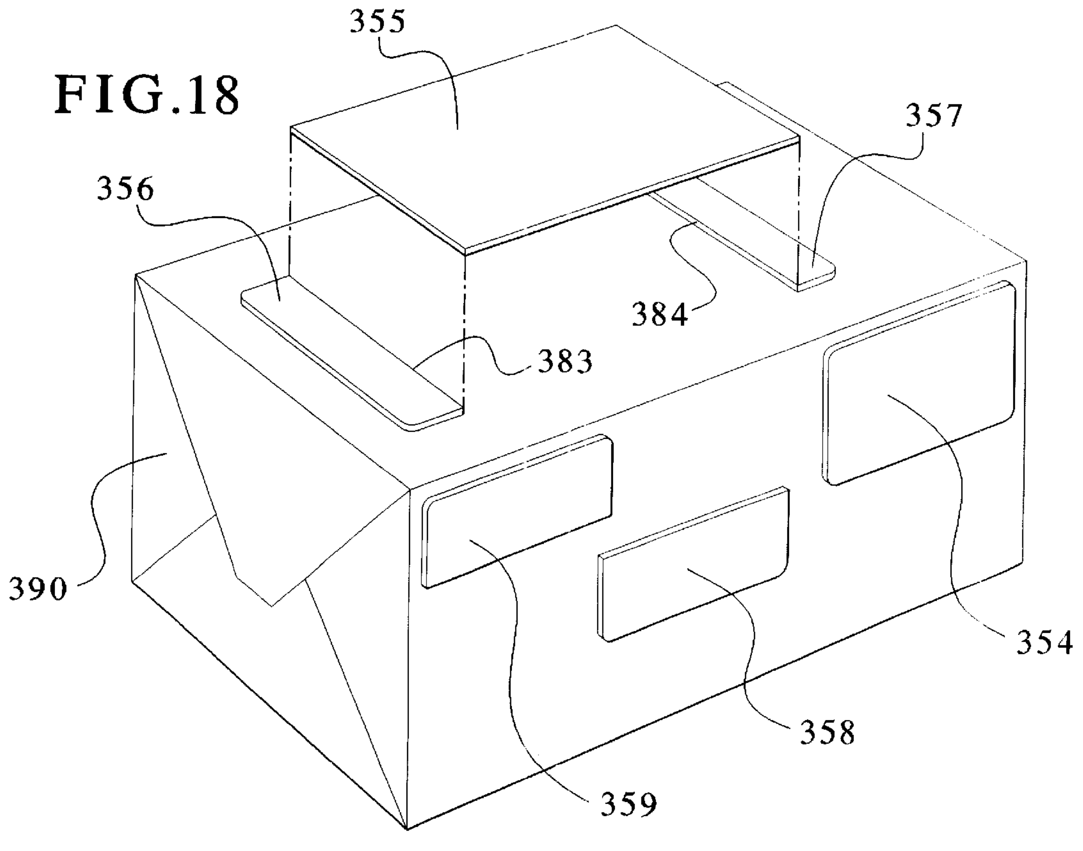
FIG. 18 illustrates a perspective view of a front side of an embodiment of the mailing form of FIG. 14 with separable portions affixed to a mailpiece and with a return receipt postcard of the mailing form detached from anchor portions of the mailing form.

FIG. 18 shows the mailing form 352 of the mailing assembly 351 shown in FIG. 14 attached to its associated mailpiece 390. According to this embodiment of the present invention, the address label 358, the return address label 359 and the mailing label 354 are all affixed to one side of the mailpiece 390 as shown using their respective adhesive backings. The first anchor section 356 and the second anchor section 357, and the return receipt post card 355 disposed therebetween, are then adhesively affixed to another side of the mailpiece 390. Upon delivery of the mailpiece 390, the return receipt postcard 355 is detached from the first anchor section 356 and the second anchor section 357 along the seventh tear line 383 and the eighth tear line 384, respectively. The return receipt postcard 355 may then be used for delivery confirmation purposes as already described herein.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A method for mailing a mailpiece requiring delivery confirmation, the method comprising the steps of:

providing a backing sheet;

removably attaching a mailing form to the backing sheet, the form having an addressee address label and a delivery confirmation label, the addressee address label detachably connected to the delivery confirmation label;

printing addressee information on the addressee address label;

affixing the addressee address label to the mailpiece; and, affixing the delivery confirmation label to the mailpiece.

2. The method of claim 1 further comprising the step of:

providing an adhesive layer between the form and the backing sheet.

3. The method of claim 1 further comprising the step of:

printing machine-readable code on the form including machine-readable information associated with the mailpiece.

4. The method of claim 1 further comprising the steps of:

providing a postage label on the form, the postage label detachably connected to remaining portions of the form; and affixing the postage label to the mailpiece.

5. The method of claim 1 further comprising the steps of:

providing an auxiliary label on the form, the auxiliary label detachably connected to remaining portions of the form;

printing return address information on the auxiliary label; and affixing the auxiliary label to the mailpiece.

6. The method of claim 1 further comprising the steps of:

providing an auxiliary label on the form, the auxiliary label detachably connected to remaining portions of the form;

printing variable information on the auxiliary label; and detaching the auxiliary label from the remaining portions of the form.

7. The method of claim 1 further comprising the steps of:

providing an anchor section on the delivery confirmation label; and providing a delivery confirmation card on the delivery confirmation label connected to the anchor section.

8. The method of claim 7 further comprising the step of:

providing an adhesive layer between the backing sheet and both the addressee address label and the anchor section and not between the backing sheet and the delivery confirmation card.

9. The method of claim 7 further comprising the step of:

detaching the delivery confirmation card from the delivery confirmation label.

10. The method of claim 1 further comprising the step of:

printing variable information on the mailing form.

* * * * *